J. EDGAR
Nov. 10, 1931. HOB GRINDING MACHINE Re. 18,247
Original Filed June 28, 1916 5 Sheets-Sheet 1
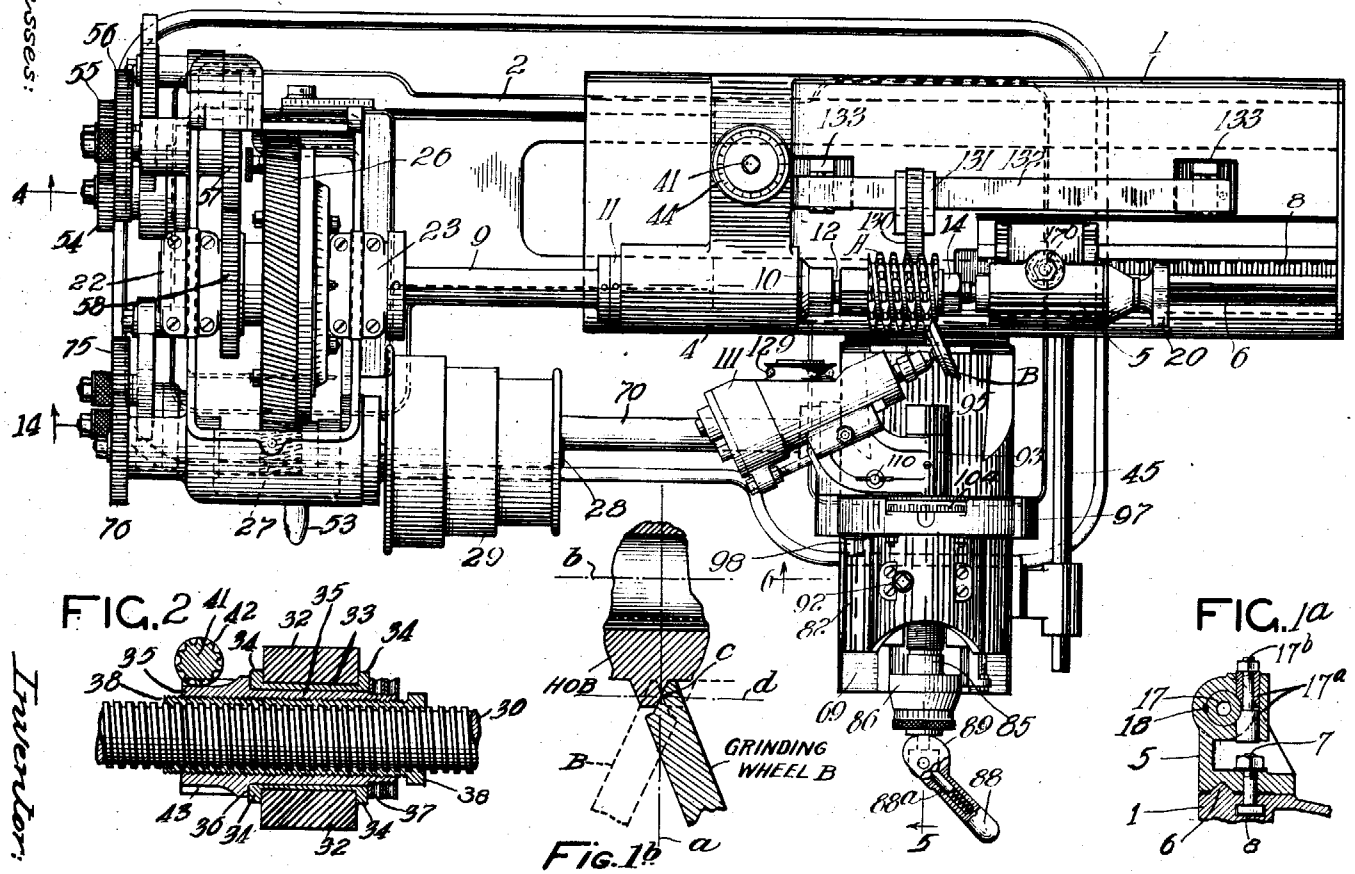
Witnesses:
J. C. Derrick.
George L. Chindahl
Inventor:
John Edgar
By Luther L. Millen
Atty.

Nov. 10, 1931.

J. EDGAR

HOB GRINDING MACHINE

Re. 18,247

Original Filed June 28, 1916

5 Sheets-Sheet 2

Witnesses:

J. C. Devick.

George L. Chindahl

Inventor:

John Edgar

By Luther R. Miller

Atty.

J. EDGAR

Nov. 10, 1931. HOB GRINDING MACHINE Re. 18,247

Original Filed June 28, 1916 5 Sheets-Sheet 3

Witnesses:

J. C. Derick

George L. Chindahl

Inventor:

John Edgar

By Luther R. Miller

Atty.

J. EDGAR

Nov. 10, 1931. HOB GRINDING MACHINE Re. 18,247

Original Filed June 28, 1916 5 Sheets-Sheet 4

Witnesses:
J. C. Derick.
George L. Chindahl

Inventor:
John Edgar:
By Ruther L. Miller
Atty.

Nov. 10, 1931.

J. EDGAR

HOB GRINDING MACHINE

Re. 18,247

Original Filed June 28, 1916 5 Sheets-Sheet 5

Witnesses:

J. C. Deerick.

George L. Chindahl

Inventor:
John Edgar

By Luther R. Miller

Atty.

Reissued Nov. 10, 1931

Re. 18,247

UNITED STATES PATENT OFFICE

JOHN EDGAR, OF ROCKFORD, ILLINOIS, ASSIGNOR, BY MESNE ASSIGNMENTS, TO BARBER-COLMAN COMPANY, OF ROCKFORD, ILLINOIS, A CORPORATION OF ILLINOIS

HOB GRINDING MACHINE

Original No. 1,561,064, dated November 10, 1925, Serial No. 106,339, filed June 28, 1916. Application for reissue filed April 20, 1931. Serial No. 531,653.

This invention relates to the manufacture of hobs used in generating spur and spiral gear wheels. After the partially-completed hobs have been hardened, it is necessary to grind the teeth of the hobs to give them correct form and dimensions.

The object of this invention is to produce a machine by means of which the teeth of a hob may be quickly and accurately ground to form and size.

A hob has one or more spiral series of relieved cutting teeth, the cutting faces of the teeth being defined by gashes which may be either straight (i. e. parallel with the axis of the hob) or spiral. In order that the hob shall have relatively long life, a circumferential length of the teeth is made as great as possible, which means that the gashes are relatively narrow—much narrower, proportionately, than in the case of a tap, for instance. Because of the length of the teeth, there is considerable difference between the height of a tooth at its front end and its height at its rear end, which fact necessitates a relatively long relieving stroke and an abrupt return stroke. Moreover, because of the narrowness of the gashes it is impracticable to grind the two opposite sides of a tooth space at the same time. Before finishing one such tooth space the grinding wheel would engage the next tooth space.

In order to avoid rotating the grinding element at an objectionably high speed and to prevent excessive wear on the grinding element, it is desirable to use an abrasive wheel of relatively large diameter; and in order to obtain clearance between the wheel and each succeeding tooth, it is desirable to mount the wheel so that its periphery may be employed in grinding.

The machine herein disclosed is specially adapted to fulfill the requirements peculiar to the grinding of hobs, straight-gashed as well as spiral-gashed, and to produce accurate work at a relatively fast rate and with a minimum of interruption for dressing the grinding element.

In the accompanying drawings, Figure 1 is a top plan view of a hob-grinding machine embodying the features of my invention.

Fig. 1[a] is a fragmental sectional view of the tail stock of the machine.

Fig. 1[b] illustrates the position of the grinding wheel with relation to the hob.

Fig. 2 is a sectional view of the connection between the hob slide and the feed-screw for moving said slide, the view being taken in the plane of dotted line 2—2 of Fig. 5.

Figures 5, 5A, 6, 7:
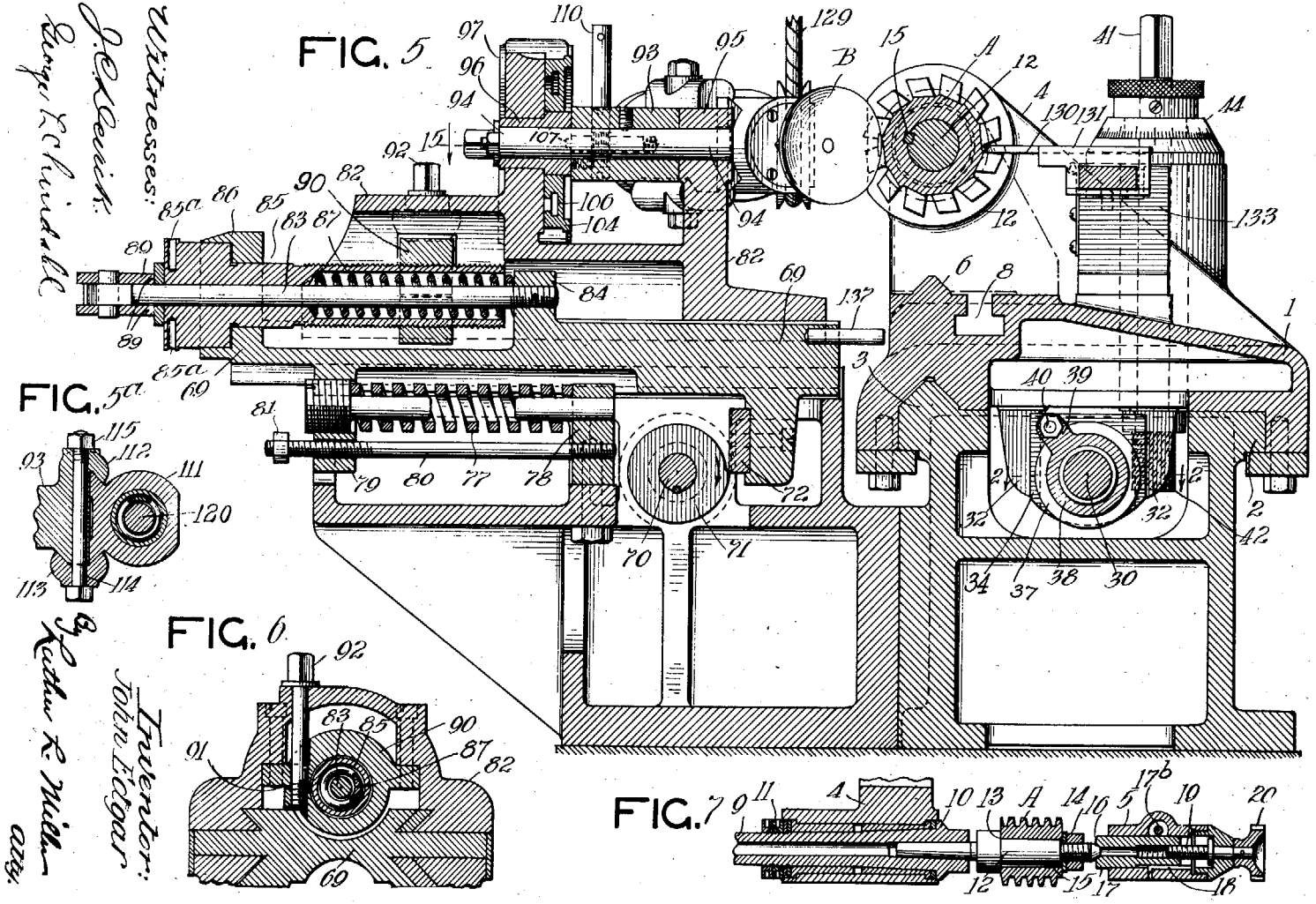
Fig. 5 is a section taken in the plane of dotted line 5 of Fig. 1.

Fig. 5[a] is a view of a clamp for the wheel-carrying head.

Fig. 6 is a section on dotted line 6 of Fig. 1.

Fig. 7 is a horizontal central sectional view of the hob-supporting means.

Figure 3:
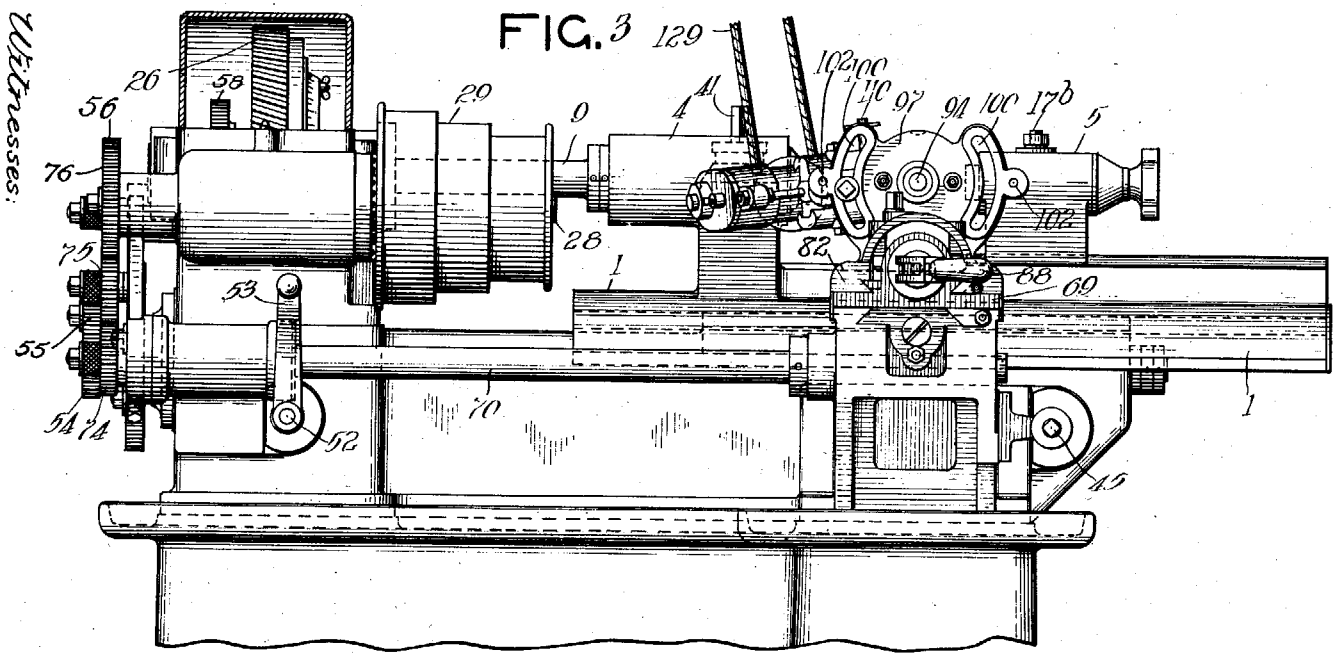
Fig. 3 is a fragmental side elevation of the machine.
Figure 8:
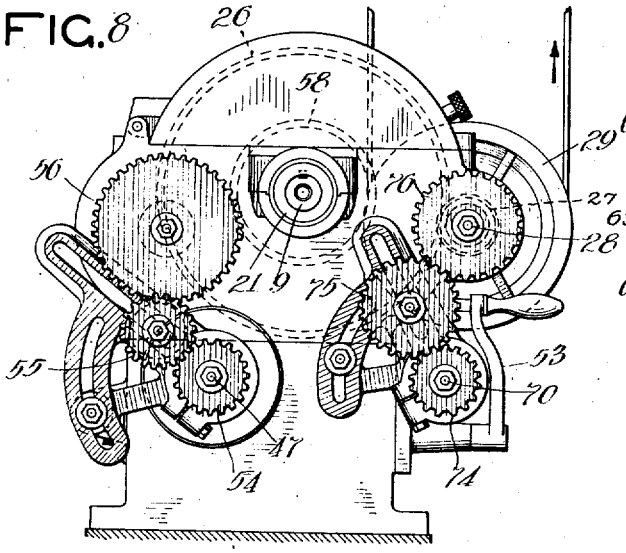

Fig. 8 is a view looking from the left-hand end of Fig. 3.

Figure 9:
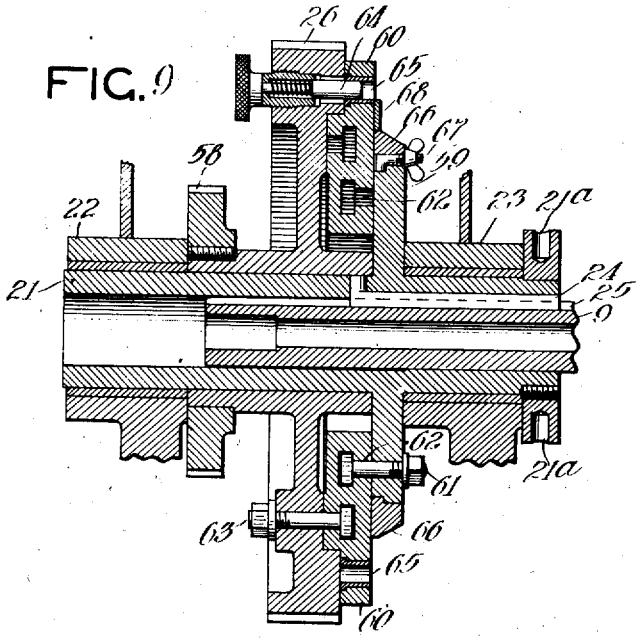

Fig. 9 is a sectional view of the means for rotating the hob.

Figure 10:
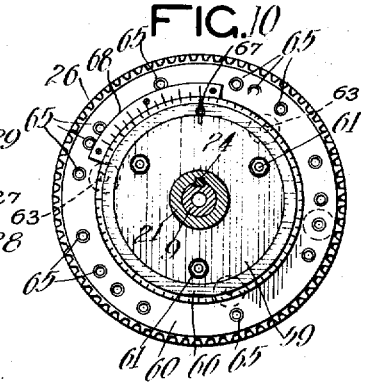

Fig. 10 is a view of the means for indexing a plural-thread hob.

Figure 4:
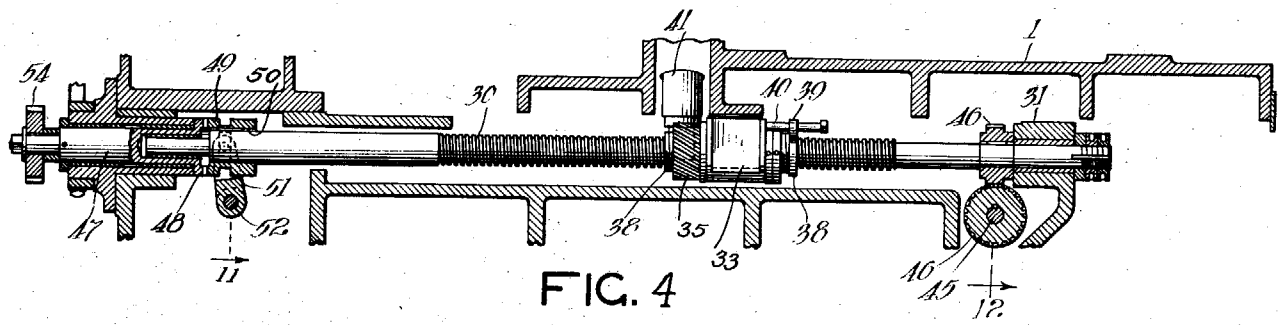
Fig. 4 is a section taken in the plane of dotted line 4 of Fig. 1.
Figure 11:
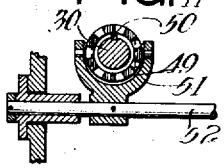

Fig. 11 is a section on dotted line 11 of Fig. 4.

Figure 12:
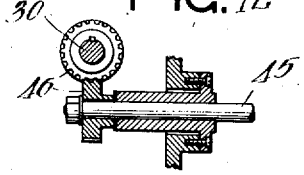

Fig. 12 is a section on dotted line 12 of Fig. 4.

Figure 13:
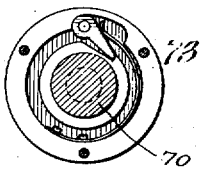
Figure 14:
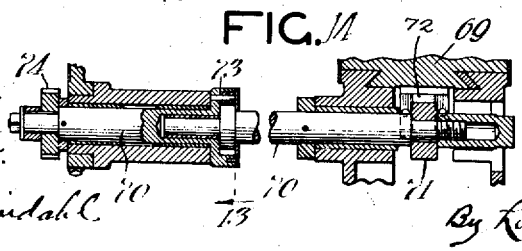

Fig. 13 is a section on dotted line 13 of Fig. 14.

Fig. 14 is a section on dotted line 14 of Fig. 1.

Figure 15:
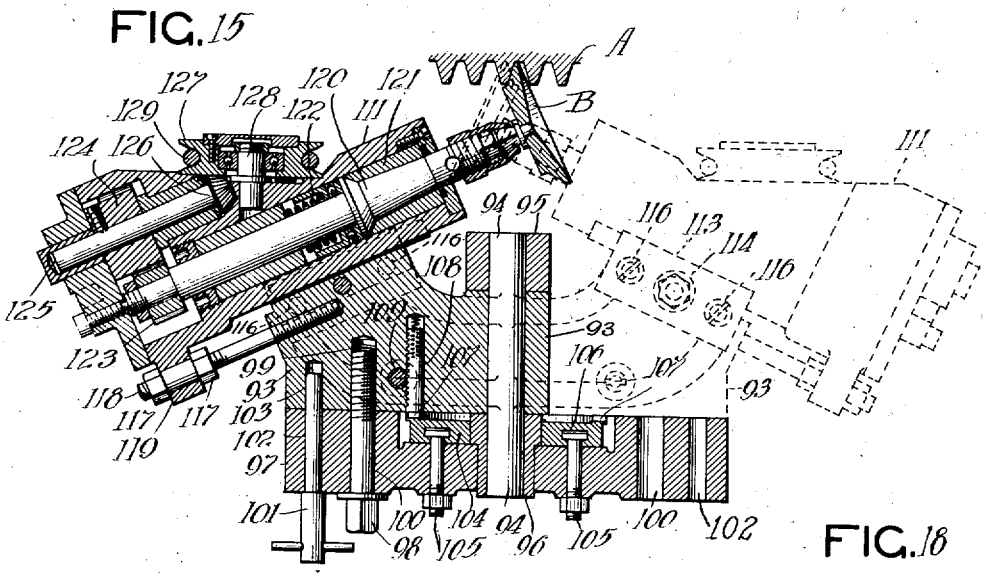

Fig. 15 is a section on dotted line 15 of Fig. 5.

Figure 16:
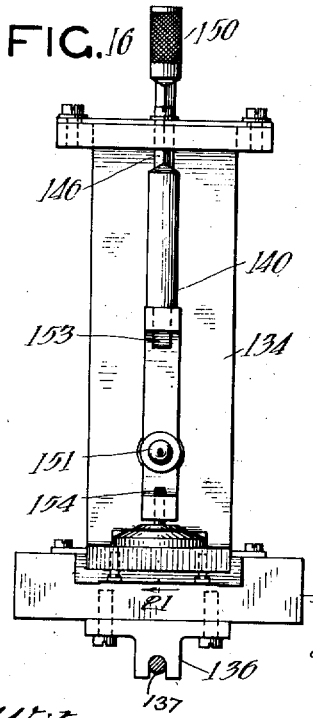
Figure 17:
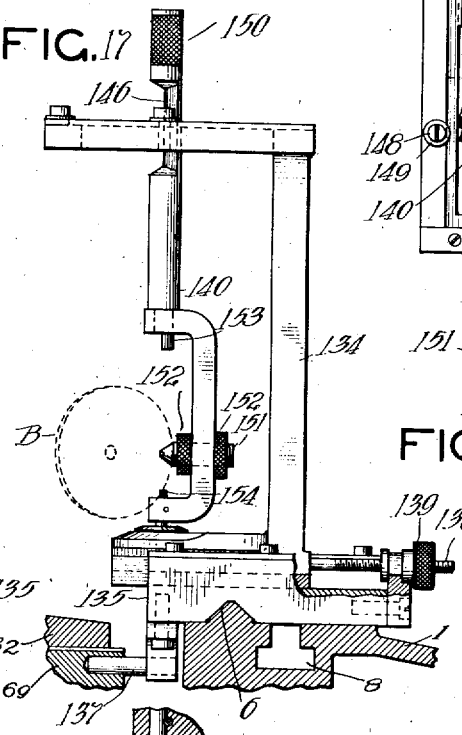

Figs. 16 and 17 are views of an attachment for dressing the grinding wheel.

Figure 18:
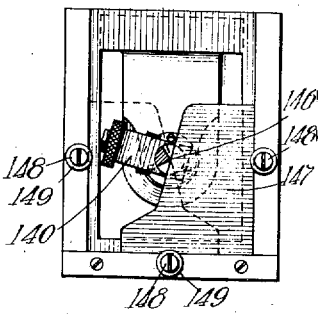

Fig. 18 is a top plan view of the dressing attachment.

Figure 19:
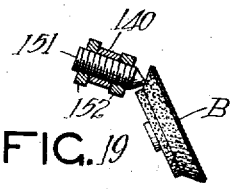

Fig. 19 is a view showing the dressing tool in operative relation to the grinding wheel.

Figure 20:
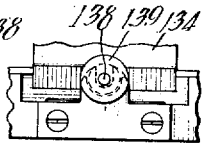

Fig. 20 is a fragmental view looking from the right-hand side of Fig. 17.

Figure 21:
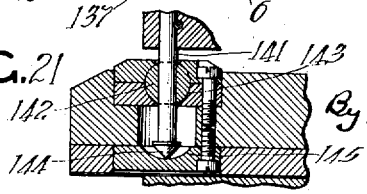

Fig. 21 is a section on dotted line 21 of Fig. 16.

Referring to the top plan view entitled Fig. 1: A indicates a hob and B a grinding wheel. In operation, the grinding wheel B is rotated at high speed. The hob A is slowly rotated in the opposite direction and is also given a movement of translation past the grinding wheel, the rotation and movement of translation of the hob being so proportioned to each other that one side of the thread (or, more accurately speaking, the spiral series of relieved teeth) of the hob is presented to the grinding wheel. After the hob has been fed past the grinding wheel, the hob is returned to initial position and adjusted with relation to the grinding wheel so that the latter shall be able to remove more material. The hob is then rotated and fed past the grinding wheel as before. These operations are repeated until one side of the thread of the hob has been completely ground. The head that carries the grinding wheel is then reversed so as to place the grinding wheel in position to grind the other side of the thread of the hob. The hob is then fed past the grinding wheel the desired number of times until the last mentioned side of the thread has been properly ground.

A slide 1, upon which the hob is supported, is mounted upon two guides 2 and 3 (Fig. 5) formed upon the bed of the machine. Upon the slide 1 is a headstock 4 and a tailstock 5, the latter being adjustable toward and away from the headstock upon a guide 6. The tailstock is secured to the slide 1 in adjusted position by means of a bolt 7 (Fig. 1[a]) extending through the tailstock, the head of said bolt lying within a T-slot 8 in the slide. A spindle 9 (Figs. 1, 3 and 7) is rotatably supported in the headstock 4 and is held against longitudinal movement in said headstock by means of a flange 10 and a collar 11. The spindle 9 is made tubular to permit of inserting and removing the support or arbor 12 that carries the hob. The arbor 12 has a tapered portion adapted to be driven into a correspondingly tapered socket in the end of the spindle 9. The spindle being tubular, as shown in Figs. 7 and 9, a rod may be inserted into the other end of the spindle for the purpose of driving out the arbor 12 when necessary. The hob is secured upon the arbor between an annular shoulder 13 and a nut 14, and is further held against rotation with relation to the arbor by means of a key 15. The end of the arbor opposite to the tapered end is provided with a center 16 arranged to be rotatably supported by a sleeve 17 carried by the tailstock 5. Said sleeve is held against rotation by means of a key 18 and is arranged to be moved into and out of operative relation to the center 16 by means of a screw 19 having an operating hand wheel 20. Clamp members 17[a] (Fig. 1[a]) and a screw 17[b] provide means for securely locking the sleeve 17 against movement.

The means for rotating the spindle 9 comprises a sleeve 21 (Fig. 9) rotatably mounted in bearings 22 and 23 in the supporting framework of the machine. The spindle 9 is slidable longitudinally of the sleeve 21, but is caused to rotate with the sleeve by means of a spline 24 (Fig. 9) connected to the sleeve and lying within a keyway 25 in the spindle. By means to be later described, the sleeve 21 is adjustably connected to a gear wheel 26 that meshes with a pinion 27 (Fig. 1) fixed on the drive shaft 28. On said shaft is secured a stepped pulley 29. Said pulley is driven from a reversible countershaft (not shown) or other suitable source of power.

The means for feeding the slide 1 comprises a feed screw 30 (Figs. 4 and 5) supported in a bearing 31 in the machine frame. Rigid with the slide 1 are two downwardly extending lugs 32 (Figs. 2 and 5). A bearing 33 lies between these lugs and has flanges 34 to cause the lugs and bearing to travel together. Rotatably mounted in the bearing 33 is a nut 35, said nut being held against endwise movement with relation to the bearing 33 by means of a shoulder 36 and a nut 37. The nut 35 is threaded upon a nut 38 on the feed screw 30. The nut 38 is prevented from rotating with relation to the bearing 33 by means of an arm 39 which is rigid with said nut, said arm having an opening through which a pin 40 is slidable (see Fig. 4), said pin being fixed in the bearing 33 and extending longitudinally of the feed screw 30. When the feed screw 30 is rotated, the nut 38 will be caused to move longitudinally of said feed screw, the nut 38 carrying with it the nut 35, the bearing 33 and the lugs 32, and thus imparting movement to the slide 1.

In order that the slide 1 shall be adjustable with relation to the nut 38 I provide a shaft 41 rotatably supported in the slide 1 and having upon its lower end spiral gear teeth 42 meshing with similar teeth 43 formed upon the nut 35. The upper end of the shaft 41 is squared to receive a crank. Fixed to the shaft 41 is a micrometer dial 44 arranged to coact with a zero mark on the adjacent portion of the slide. After the wheel B has made a cut and the slide 1 has been returned, the slide may be adjusted by means of the shaft 41 to permit the grinding wheel B to make another cut on the same side of the thread of the hob.

The feed screw 30 is arranged to be rotated by power means for advancing the hob with relation to the grinding wheel and is also arranged to be rotated by manually actuated means for the purpose of returning the slide 1 to initial position; said manually actuated means comprises a shaft 45 (Figs. 1, 3 and 4), said shaft being connected to the feed screw 30 by means of spiral gears 46 and the outer end of said shaft being squared to receive a crank.

The power means for rotating the feed screw 30 comprises a clutch shaft 47 (Fig. 4)

alined with and supporting one end of the feed screw 30 and having a clutch face 48 arranged to be engaged by a clutch member 49 which is slidable longitudinally of the feed screw 30. The feed screw 30 and the clutch member are caused to rotate together by means of a key 50 (Fig. 11). The clutch member 49 is arranged to be slid longitudinally of the feed screw 30 by means of a fork 51 engaging said clutch member and fixed upon a rock shaft 52. Upon the outer end of the rock shaft 52 is fixed a hand crank 53 (Fig. 3). After the clutch member 49 has been disengaged from the clutch shaft 47, the shaft 45 may be rotated to adjust the slide 1 to place the hob in approximately operative relation to the grinding wheel. Fixed to the clutch shaft 47 is a change-gear 54 (Figs. 4 and 8) meshing with a change-gear 55; the latter gear is rigid with a change-gear that meshes with a change-gear 56; the change-gear 56 is rigid with a gear 57 that meshes with a gear 58 which is rigid with the gear 26; the latter, it will be remembered, meshes with a pinion 27 on the drive shaft 28.

A hob may have one or a plurality of threads. After one thread of a multiple thread hob has been ground, it is necessary to turn the hob to bring another thread into position to be ground. For this purpose the spindle 9 is adjustably connected to the gear wheel 26. Rigid with the sleeve 21 in a flange or disk 59. A ring 60 is adjustably secured to the disk 59 by means of bolts 61 extending through the disk 59 and having heads that lie within circular under-cut slots 62 in the ring 60. The ring 60 is adjustably secured to the gear wheel 26 by similar clamp bolts 63. For setting the ring 60 with relation to the gear wheel 26 there is provided a spring-pressed index pin 64 carried by the gear wheel 26 and arranged to enter any one of a number of openings 65 in the ring 60. When one thread of a double-thread hob has been ground, the clamp bolts 63 are loosened, the index pin 64 drawn back and the ring 60 turned through one-half of a revolution, thus bringing an opening 65 into register with the index pin 64, which latter is then permitted to spring into said opening. In the case of a triple thread hob the operator would turn the ring 60 with relation to the gear wheel 26 through one-third of a revolution, thus bringing an opening 65 into register with the index pin 64. For thus turning the ring 60, a bar (not shown) would be inserted in openings 21[a] (Fig. 9) in a collar on the sleeve 21. Any desired number or arrangement of openings 65 may be provided to take care of hobs having various numbers of threads. In order that the spindle 9 may be adjusted for hobs having a number of threads not provided for by the spacing of the openings 65, the disk 59 and the ring 60 are adjustably connected together as hereinbefore stated.

A graduated ring 66 is rotatably mounted upon the periphery of the disk 59 and is secured thereto in adjusted position by means of a clamp bolt 67. On the ring 60 is a vernier 68. Normally the zero line on the ring 66 is opposite the zero line of the vernier 68. After one thread of a hob having such special number of threads has been ground, the hob is turned to bring the next thread into position to be acted upon by the wheel B by loosening the clamp bolt 61 and turning the disk 59 with reference to the vernier 68 through an arc of the necessary length. The clamp bolts 61 are then tightened, the bolt 67 slackened, the ring 66 returned to zero position and the bolt 67 again tightened. When the next thread is to be ground, the flange 59 is again turned with reference to the vernier 68 through the same angular distance as before.

The adjustable connection between the flange 59 and the ring 60 affords means for conveniently setting the hob with relation to the relieving cam 71 so that as the hob rotates the grinding wheel shall be moved outwardly in time to begin operation on each succeeding tooth.

The grinding wheel B is carried by a slide 69 (Figs. 1 and 5) which is reciprocable at right angles to the direction of movement of the slide 1. As shown in Fig. 5, the teeth of the hob A are relieved with a uniform clearance. As a tooth revolves past the wheel B, the slide 69 is moved toward the slide 1 to maintain the wheel in proper relation to the tooth. As soon as the tooth has passed the wheel the slide 69 is given a quick outward movement to place the wheel B in position to grind the next succeeding tooth. The means for thus reciprocating the slide 69 comprises a shaft 70 (Figs. 1, 3 and 5) carrying a cam 71 arranged to operate against a block 72 upon the slide 69. As shown in Fig. 14, the shaft 70 is made in two sections connected by the one-way clutch 73 shown in Fig. 13, in order that the cam 71 shall not interfere with reverse movement of the rest of the machine when it is desirable to turn the drive shaft 28 backward in adjusting the relation of the hob to the grinding wheel. The shaft 70 is driven from the drive shaft 28 through change gears 74, 75 and 76 (Fig. 8).

The slide 69 is moved away from the hob by means of a coiled compression spring 77 (Fig. 5) which bears at one end against a stationary post 78 and is adjustably connected at its other end to a lug 79 on the slide 69. A rod 80 fixed to the post 78 and extending freely through the lug 79 carries a nut 81 which may be turned up against the lug 79 for the purpose of forcing the slide 69 away from the cam 71 when another cam is to be substituted.

Upon the slide 69 is mounted a slide 82 for movement parallel with the direction of movement of the slide 69. When the machine is running the slide 82 is stationary with relation to the slide 69, but means is provided whereby the slide 82 may be moved toward and away from the hob when the machine is being adjusted. Referring to Fig. 5: A bar 83 is fixed to a lug 84 on the slide 69. On the bar 83 is slidably and rotatably mounted an adjusting screw 85 having holes 85[a] to receive an implement for turning the screw. The screw 85 is slidably and rotatably supported in a guide 86 on the slide 69. A coiled compression spring 87 surrounding the bar 83 bears at one end against the lug 84 and at its other end against a portion of the screw 85. The spring 87 is restrained by a hand lever 88 (Fig. 1) which is pivoted to the outer end of the bar 83, said hand lever having a cam portion 89 that bears against a washer which in turn lies in contact with the screw 85. A detent 88[a] yieldingly locks the handle 88 against movement.

It will be seen that I have provided three mutually independent means for producing movement of the slide toward and away from the hob, namely, the cam 71 and the spring 77, the screw 85, and the hand lever 88 and its connections.

The slide 82 is fixed to the screw 85 by the means shown in Figs. 5 and 6. 90 is a nut rigidly secured to the slide 82 and engaging the screw 85. In order that the nut 90 may be tightly clamped to the screw 85, said nut is split at one side (as at 91) and is arranged to be contracted into clamping engagement with the screw by means of a screw 92.

The grinding-wheel spindle is carried by a frame 93 (Fig. 15) provided with trunnions 94 which are mounted for oscillation in a bearing 95 on the slide 82 and in a bushing 96 carried by a portion 97 of the slide 82. It will be observed that the bearing 95 and portion 97 of the slide together constitute a tool post in which the tool-carrying frame 93 is pivoted upon an axis *a* (Figs. 1[b] and 15) intersecting the axis *b* of the hob at a right angle. When grinding the hob the point of intersection *c* of the pitch line *d* of the hob and the line of contact of the hob and the grinding wheel is in the axis *a* of the trunnions 94. The frame 93 is arranged to be held against swinging movement by means of a screw 98 engaging a threaded opening 99 in said frame and adapted to extend through either of two diametrically opposite curved slots 100 in the slide portion 97. When dressing a grinding wheel that is to be used in grinding the teeth of a spirally gashed hob, the frame 93 should be secured in the horizontal plane of the spindle 9, and for this purpose I provide a positioning pin 101 adapted to be inserted into either one of two openings 102 provided at diametrically opposite points in the portion 97. The pin 101 is adapted to enter a hole 103 in the frame 93. The pin 101 is used only in setting the frame 93 preparatory to dressing the grinding wheel, and at other times is withdrawn from the openings 102 and 103.

For setting the frame 93 at an angle corresponding to the angle of the thread of the hob, I provide a protractor ring 104 (Figs. 1, 5 and 15) rotatably mounted upon the bushing 96 and arranged to be clamped to the portion 97 by means of bolts 105 extending through the portion 97 and having heads lying in an annular T-slot 106 in the protractor ring. At diametrically opposite points on the protractor ring are formed notches 107 to receive a spring-pressed detent pin 108 carried by the frame 93. For withdrawing the pin 108 from engagement with a notch 107, there is provided a pinion 109 arranged to engage rack teeth formed on the pin 108. The upper end of the pinion 109 is adapted to be engaged by a key 110.

The protractor ring 104 is provided with graduations as shown in Fig. 1, and the portion 97 is provided with a cooperating zero mark.

The grinding-wheel spindle is carried by a power head 111 which is mounted in a clamp on the frame 93. The construction of this clamp will be apparent from Fig. 5[a]. The jaw 112 of the clamp is relatively stationary, while the jaw 113 is arranged to be drawn toward the jaw 112 by means of a bolt 114 and nut 115 so as to clamp the head 111 rigidly to the frame 93. The clamp jaw 113 is loosely secured to the frame 93 by means of two screws 116 (Fig. 15). After the nut 115 has been loosened, the head 111 may be slid back and forth with relation to the frame 93 by operating nuts 117 on a screw stud 118 fixed to the frame 93, said nuts lying at opposite sides of a lug 119 on the head 111.

The grinding wheel B is removably secured in any usual or suitable way to a spindle 120 (Fig. 15), the axis of which intersects the axis of the frame 93. Said spindle has a tapered portion which lies within a correspondingly tapered bushing 121 in the head 111, the spindle being urged forward against said bushing by means of a coiled spring 122. Fixed to the spindle 120 is a gear wheel 123 that meshes with a gear wheel 124 on a shaft 125 arranged parallel to the spindle and carried by the head 111. Rigid with the shaft 125 is a bevel gear wheel 126 that meshes with crown gear teeth formed upon one side of a flanged driving pulley 127, said pulley being rotatably mounted upon a stud 128 fixed to the head 111. The pulley 127 receives a belt 129 extending from a countershaft or other suitable source of power.

While the sequence of operations in making the several adjustments may be varied, the operation of grinding a single thread hob may be described, in general, as follows: The handle 88 (Fig. 1) is operated to allow the spring 87 (Fig. 5) to move the slide 82 outwardly. The frame 93 is adjusted, with the aid of the protractor ring 104, to the proper inclination with reference to the angle of the thread of the hob (see Fig. 3), the frame 93 being secured in adjusted position by means of the screw 98. The tailstock 5 is slid away from the headstock 4. The arbor 12 is inserted into the tapered end of the spindle 9. The hob is placed on said arbor and secured thereto by means of the nut 14. The tailstock is slid up to place the end of the sleeve 17 against the center 16. The nut on the bolt 7 is tightened up to clamp the tailstock in place. The hand-knob 20 is turned to press the sleeve 17 against the center 16, and the sleeve is locked in adjusted position by means of the clamp 17[a]. The clutch 49 being in the thrown-out position, the shaft 45 is rotated manually until the side of the forward end of the thread is near the working portion of the grinding wheel B, after which the clutch 49 is thrown in. The handle 88 is then turned to advance the wheel B toward the hob. The flange 59 is then adjusted with relation to the ring 60 until the hob is in proper relation to the cam 71. The machine is then set in operation, whereby the wheel B is rapidly rotated, the slide 1 slowly advanced, and the spindle 9 slowly rotated. By means of the shaft 41 the operator accelerates the feed movement of the slide 1 until the grinding wheel is making a proper cut. After the hob has been fed past the grinding wheel B, the machine is stopped, said wheel is withdrawn by operating the handle 88, and the slide 1 is returned to initial position by reversing the drive for the pulley 29. After the slide has been returned to initial position, the machine is stopped, the wheel B is returned to working position by means of the hand lever 88, and the machine again set in operation to feed the hob past the grinding wheel. The operator turns the shaft 41 so as to advance the slide 1 sufficiently to enable the wheel B to make a second cut of proper depth.

After one side of the thread has been completely ground, the machine is stopped, the clutch 49 thrown out, the wheel B retracted by means of the lever 88, the slide 1 returned by means of the shaft 45, and the clutch 49 thrown in. The screw 98 (Fig. 15) is withdrawn; the detent pin 108 is removed from the notch 107 with which it is in engagement; the frame 93 is swung through an arc of 180 degrees until the detent pin 108 springs into the other notch 107; the screw 98 is inserted into the other slot 100 and into the hole 99 and tightened to secure the frame 93 rigidly in place. The belt 129 is then removed from the pulley 127 and twisted and replaced. The wheel B is then moved forward into grinding position. The slide 1 is then adjusted to move the hob longitudinally, a distance approximately one-half the circular pitch of the hob so as to bring the unground side of the thread into approximate position to be ground. The machine is started up and the shaft 41 is turned until the wheel is making a proper cut. After the second side of the thread has been made smooth, the operator employs at intervals a suitable gauge in order to ascertain when the hob has been completely ground. The form of gauge herein shown comprises a gauge member 130 (Figs. 1 and 5) mounted for sliding movement toward and away from the hob in a carrier 131, said carrier being slidable longitudinally of the hob on a guide bar 132. The bar 132 is removably and stationarily supported upon two posts 133 on the slide 1. The gauging is, of course, done when the machine is idle.

In grinding a multiple thread hob the spindle 9 is indexed or turned with relation to the gear wheel 26 after each thread has been completely ground. A suitable gauge (not shown) would be applied by the operator to determine when the grinding of a thread has been completed.

Suitable modifications are made in the change-gear train 54, 55, 56 in accordance with changes in the number of threads of the hob.

As shown, the machine is arranged to grind a right-hand hob. To operate upon a left-hand hob an additional change gear (not shown) would be provided in the gear train 54, 55, 56 so as to reverse the direction of feed movement of the slide 1.

Changes in the gear train 74, 75 and 76 are made as required by the number of flutes or gashes in the hob to be ground, and when changing from a hob having straight flutes to one having spiral flutes or vice versa. Variations in the amount of relief of the teeth of the hobs operated upon are taken care of by changes in the shape of the cam 71.

To dress the shaped periphery of the grinding wheel I provide means comprising a bracket 134 (Fig. 17) having a base 135 adapted to be seated upon the guide 6. To the base 135 is secured a notched lug 136 adapted to engage a positioning pin 137 fixed to the slide 69, whereby the bracket 134 may be properly located opposite the grinding wheel. The bracket 134 is adjustable upon the base 135 toward and away from the grinding wheel by means of a screw-threaded rod 138 secured to said bracket and having a nut 139 thereon. Said nut rests in a recess in the base 135 and is held by the walls of said recess against longitudinal movement. An arm 140 is provided at its lower end with a rod 141 which extends slidably through a ball 142. Said ball is rotatably mounted in a socket 143 in the lower portion of the bracket 134. The lower end of the rod 141 is provided with a point 144 that rests in a socket 145 in the lower part of the bracket 134. The upper portion of the arm 140 is provided with a knife edge 146 arranged to be moved along the edge of a templet 147. The outline of the working portion of the templet 147 corresponds to the outline to be imparted to the sides of the teeth of the hob. The templet 147 is arranged to be secured to the upper portion of the bracket 134 by means of screws 148 and washers 149 overlying said templet. As indicated by full and dotted lines in Fig. 18, the templet may be secured to the bracket in either of two positions so that the wheel may be dressed when the frame 93 is in either of its two horizontal positions. At the upper end of the arm 140 is a handle portion 150. A dressing tool 151 having a point of sufficiently hard material is located on the arm 140 in the horizontal plane of the axis of the wheel B and is secured to the arm 140 by means of nuts 152. For convenience in locating the point of the dressing tool in the line containing the center of the ball 142 and the knife edge 146, I provide flattened pins 153 and 154 above and below the dressing tool, against which pins a straight edge may be placed to serve as a guide in positioning the dressing tool. The radius of the socket 145 is such that as the arm 140 is oscillated upon the center of the ball 142 and moved along the edge of the template 147, the arm will be moved up and down sufficiently so that the point of the dressing tool shall trace, in a horizontal plane, the contour of the surface to be ground upon the teeth of the hobs.

The hob illustrated in Fig. 1 has straight flutes or gashes, that is to say the gashes are parallel to the axis of the hob. Some hobs are provided with spiral gashes which are normal to the thread. As hereinbefore stated, when dressing a wheel that is to be used for grinding the teeth of a spirally-gashed hob, the frame 93 is secured in horizontal position. When dressing a wheel to be used for grinding the teeth of a straight gashed hob, as herein shown, the frame 93 is secured in a position inclined to the same degree as when grinding.

While the wheel is being dressed, it may be rotated in a reverse direction, if desired, the belt 129 being arranged accordingly.

A decrease in the diameter of the wheel B, due to wear and dressing, is adjusted for by advancing the slide 82 with relation to the slide 69 by turning the screw 85, and by retracting the head 111 by adjusting the nuts 117.

As hereinbefore stated, the grinding wheel should be so positioned with relation to the hob that there shall be clearance between the wheel and the approaching hob tooth. This result has been attained by mounting the grinding wheel spindle in a manner which, for the sake of clearness, may be described by saying that the spindle is at an oblique angle to the hob axis when the spindle is in the horizontal plane of the hob axis. In the present instance, said angle is about 25 degrees. Because of this oblique mounting, it will be understood that the periphery of the wheel curves away from the approaching tooth and thus permits of grinding a relatively long surface on the side of each tooth, whereby I am enabled to produce a ground relieved hob which can be resharpened a relatively large number of times without change of form or dimensions.

While I have described the present embodiment of the invention in considerable detail, it will be understood that the invention is not limited to the construction herein shown, except as indicated by the appended claims.

I claim as my invention:—

1. A hob-grinding machine having, in combination, a grinding wheel, a rotatably mounted spindle for supporting a hob, means for causing relative movement between the wheel and the hob longitudinally of the hob, a drive wheel concentric with the spindle for rotating the same, and adjustable means connecting the spindle and drive wheel to permit of relative rotation between the same including an intermediate member, said intermediate member being adjustable with respect to both spindle and driving wheel and rigidly secured to each in the adjusted position.

2. A hob-grinding machine having, in combination, a support for a hob, means for rotating said support around the axis of said hob and sliding it along the axis synchronously, a tool adapted to slide along an axis perpendicular to the axis of said hob, and also rotatable around its axis of sliding, means for clamping said tool in adjusted angular position and means for sliding said tool.

3. A hob-grinding machine having, in combination, a grinding wheel, a slide, means on the slide for rotatably supporting a hob with its axis extending in the direction of movement of the slide, a feed screw for moving the slide, a nut on said screw, and manually adjustable means connecting said nut to the slide for movement of the slide with relation to the nut longitudinally of the screw.

4. A hob-grinding machine having, in combination, a slide, means on the slide for rotatably supporting a hob with its axis extending in the direction of movement of the slide, a feed screw for moving the slide, a nut on the feed screw, a nut secured upon the first mentioned nut, means rotatably connecting the second nut to the slide, and means for rotating the second nut.

5. A hob-grinding machine having, in combination, a grinding wheel, a rotatably mounted spindle for supporting a hob, means for causing relative movement between the wheel and the hob longitudinally of the hob, a wheel for rotating the spindle, and adjustable means connecting the spindle and second mentioned wheel to permit of relative rotation between the spindle and said second mentioned wheel.

6. A hob-grinding machine having, in combination, a hob-supporting spindle, a ring secured to said spindle to rotate therewith, a drive wheel concentric with the spindle and ring, and means for adjustably connecting said ring and wheel for relative rotation.

7. A hob-grinding machine having, in combination, means for rotatably supporting a hob, a slide, a grinding wheel carried by the slide, and three mutually independent means for producing movement of the slide toward and away from the hob.

8. A hob-grinding machine having, in combination, a grinding wheel, a slide, means on the slide for rotatably supporting a hob with its axis extending in the direction of movement of the slide, means for rotating the hob, a feed screw, a nut on the feed screw, said feed screw and nut being arranged to move the slide when the feed screw is rotated, power means for rotating the feed screw, a clutch connecting the feed screw to said driving means, and manual means for rotating the feed screw.

9. A hob-grinding machine having, in combination, means for rotatably supporting a hob, a slide mounted for movement toward and away from the hob, a grinding wheel carried by the slide, relieving means adapted to reciprocate the slide toward and away from the hob, adjustment means independent of said relieving means for moving the slide, and a third means for moving the slide to withdraw the grinding wheel clear of the hob without interfering with the operation or adjustment of said relieving or adjustment means.

10. A hob-grinding machine having, in combination, two parallel spindles, change gears determining the relative speed of said two spindles, one of said spindles being adapted to slide axially as well as rotate, means for axially moving said spindle at a constant pitch, a tool adapted to reciprocate in a line perpendicular to the axis of said slidable spindle, and a cam on the other spindle operatively connected to said tool to reciprocate the same.

11. A hob-grinding machine having, in combination, a hob-carrying spindle adapted to rotate and move axially at a constant pitch, a countershaft parallel to said spindle, means for driving said countershaft, a cam mounted for rotation on the same axis as said countershaft, a connection between said cam and said countershaft adapted to transmit rotation in one direction only, a tool slidable on a line at an angle to the axis of said spindle and an operative connection between said cam and said tool.

12. A grinding machine having, in combination, a work carriage, a power transmission for rotating the work on said carriage, manual adjustment means interpolated in said power transmission for synchronizing the same with other parts of the machine, a power transmission for sliding said carriage, and manual adjustment means interpolated in said last mentioned power transmission.

13. A grinding machine having, in combination, a work carriage, a power transmission to said carriage including a nut and a cooperating feed screw, and manual adjustment means interpolated in said transmission for manually producing independent longitudinal adjustment of said carriage.

14. A grinding machine having, in combination, a carriage, a connection transmitting power through a plurality of intermediate elements including a feed screw and cooperating nut for sliding said carriage, and means operating on one of said intermediate elements for manually producing independent longitudinal adjustment of said carriage.

15. A grinding machine having, in combination, a carriage, a feed screw and cooperating nut, a power transmission for rotating one of said two last mentioned elements, and a mechanical connection between the other element and said carriage normally constraining them to reciprocate in unison but adjustable to produce limited longitudinal displacement of said carriage independent of and superposed upon the movement produced by said power transmission.

16. A relieving hob grinder having a rotatable work spindle adapted to carry the hob, a post, a frame journaled in said post about an axis which, if extended or produced, will approximately pass through the axis of the work spindle, a grinder spindle journaled in said frame and adapted to hold the grinder in contact with the hob at a point approximately in line with the axis of rotation of the frame, means for producing relative travel between the post and the work spindle in a direction parallel to the axis of the work spindle, and means operating in timed relation with the speed of rotation of the work spindle for periodically effecting relative movement between said frame and the work spindle in a direction approximately perpendicular to the axis of the work spindle.

17. A machine for grinding either straight-gashed or spiral-gashed hobs having a spiral series of teeth, said machine comprising, in combination, means to support the hob; a grinding wheel having a periphery shaped to grind one side at a time of the spiral series of teeth, a frame to support said grinding wheel, said frame being pivoted to swing through 180 degrees to position the periphery of the wheel for grinding either side of said spiral series of teeth, the axis of said frame being perpendicular to the axis of the hob, the point of intersection of the pitch line of the hob and the line of contact of the hob and the grinding wheel being in the axis of said frame; and means to effect relative reciprocation of the wheel and the hob to relieve said teeth.

18. A relieving hob grinder having means to support and rotate a hob, a support, a frame journaled in said support for rotation through 180 degrees about an axis which if extended or produced will pass approximately through the axis of the hob, a spindle journaled in said frame at an oblique angle to the hob axis, a grinding wheel adapted to grind one side only of the hob teeth at a time and arranged to be held by said spindle in contact with the hob at a point approximately in line with the axis of said frame, means for producing relative travel between the support and the hob in a direction parallel to the axis of the hob, and means operating in timed relation with the relation of the hob for periodically effecting relative movement between said support and the hob in a direction approximately perpendicular to the axis of the work spindle to effect the grinding of relief on the teeth of the hob.

19. A relieving hob grinder having means to support and rotate a hob, a support, a frame journaled in said support for rotation through 180 degrees about an axis which if extended or produced will pass approximately through the axis of the hob, a spindle journaled in said frame at an oblique angle to the hob axis, a grinding wheel arranged to be held by said spindle with only one grinding surface in contact with the hob, means on said support at each side of the first mentioned axis for securing said frame in position with said spindle perpendicular to the hob helix at either side of said first mentioned axis, means for producing relative travel between the support and the hob in a direction parallel to the axis of the hob, and means operating in timed relation with the rotation of the hob for periodically effecting relative movement between said support and the hob in a direction approximately perpendicular to the axis of the work spindle to effect the grinding of relief on the teeth of the hob.

20. A relieving hob grinder having means to support and rotate a hob, a support, a frame journaled in said support for rotation through 180 degrees, a spindle journaled in said frame at an oblique angle to the hob axis, a grinding wheel arranged to be held by said spindle with only one grinding surface in contact with the hob, means for producing relative travel between the support and the hob in a direction parallel to the axis of the hob, and means operating in timed relation with the rotation of the hob for periodically effecting relative movement between said support and the hob in a direction approximately perpendicular to the axis of the work spindle to effect the grinding of relief on the teeth of the hob.

21. A relieving hob grinder having means to support and rotate a hob, a grinding wheel adapted to grind one side only of the hob teeth at a time, a spindle for the grinding wheel, means to support the spindle at either side of a vertical plane that is perpendicular to the hob axis with the spindle perpendicular to the hob helix and oblique to the hob axis, means for producing relative travel between the support and the hob in a direction parallel to the axis of the hob, and means operating in timed relation with the rotation of the hob for periodically effecting relative movement between said support and the hob in a direction approximately perpendicular to the axis of the work spindle to effect the grinding of relief on the teeth of the hob.

In testimony whereof, I have hereunto affixed my signature.

JOHN EDGAR.